United States Patent
Hashiba

(10) Patent No.: US 7,860,622 B2
(45) Date of Patent: Dec. 28, 2010

(54) MOTION CONTROL APPARATUS FOR VEHICLE

(75) Inventor: Hitoshi Hashiba, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 987 days.

(21) Appl. No.: 11/706,348

(22) Filed: Feb. 15, 2007

(65) Prior Publication Data

US 2007/0192003 A1 Aug. 16, 2007

(30) Foreign Application Priority Data

Feb. 15, 2006 (JP) ............................. 2006-037510

(51) Int. Cl.
*B60G 17/018* (2006.01)
(52) U.S. Cl. ....................................... 701/37
(58) Field of Classification Search .................. 701/36, 701/37, 45, 70, 124, 301; 280/734, 735; 340/903, 933, 936
See application file for complete search history.

(56) References Cited

U.S. PATENT DOCUMENTS 6,157,880 A * 12/2000 de Mersseman et al. ...... 701/45
6,657,539 B2 * 12/2003 Yamamoto et al. .......... 340/438
2004/0102888 A1 5/2004 Burgdorf et al.
2005/0071071 A1 * 3/2005 Nagata ........................ 701/70

FOREIGN PATENT DOCUMENTS

JP 2004-506572 A 3/2004

* cited by examiner

*Primary Examiner*—Kim T Nguyen
(74) *Attorney, Agent, or Firm*—Buchanan Ingersoll & Rooney PC

(57) ABSTRACT

In this vehicle motion control apparatus, vehicle behavior sensors are arranged integrally with an integrated unit composed integrally of a control unit and a brake controller. An acceleration sensor is mounted in a section adjacent to the integrated unit. If an output value from the acceleration sensor for an airbag deployment exceeds a predetermined threshold due to a collision of the vehicle etc., the vehicle motion control apparatus determines there is a possibility that a mounting posture of the integrated unit relative to a vehicle body is tilted from a reference posture by a predetermined degree or more, then prohibiting performing an ESC control. And, the vehicle motion control apparatus lights a warning lamp to notify a driver of an occurrence of abnormality in the mounting posture of the integrated unit and to urge the driver to perform repairs for an adjustment of the mounting posture.

10 Claims, 7 Drawing Sheets

MOTION CONTROL APPARATUS FOR VEHICLE

REFERENCE TO RELATED APPLICATION

This application is based on and claims under 35 U.S.C. sect, 119 with respect to Japanese Patent Application No. 2006-37510 filed on Feb. 15, 2006, the entire content of which is incorporated herein by reference.

BACKGROUND OF THE INVENTION

Field of the Invention

The present invention relates to a vehicle motion control apparatus comprising an integrated unit composed integrally of a control unit which mounts an actuator for controlling a vehicle motion, a vehicle behavior sensor which outputs a signal indicative of a behavior of a vehicle, and a controller which controls said actuator in order to control the vehicle motion on the basis of the signal output from the vehicle behavior sensor.

Conventionally, there has been widely known a vehicle motion control apparatus which controls a motion of a vehicle (attitude) by controlling a hydraulic braking force of the vehicle. In general, the motion control apparatus of this kind is configured so as to include a control unit (hydraulic unit) which has mounted thereto various actuators (motor, solenoid valve, or the like) for controlling the hydraulic braking force of the vehicle, a vehicle behavior sensor (yaw rate sensor, or the like) which outputs a signal indicative of the behavior of the vehicle and a controller which controls said actuators on the basis of the signal output from the vehicle behavior sensor.

In order to achieve a space saving of the entire aforesaid motion control apparatus and to reduce it's production cost, a technique has recently been developed for providing an integrated unit by integrating the control unit and controller (for instance, see Japanese Translation of Unexamined Patent Application (toku-hyou) No. 2004-506572).

The signal output from the vehicle behavior sensor for a certain behavior of the vehicle varies depending on a mounting posture (orientation, direction) of the vehicle behavior sensor relative to a vehicle body of the vehicle. In other words, if the mounting posture of the vehicle behavior sensor relative to the vehicle body (i.e., the mounting posture of the integrated unit relative to the vehicle body) is tilted (or inclined) from a reference posture (designed normal mounting posture), the signal output from the vehicle behavior sensor does not become a signal having a value which indicates the vehicle behavior with high accuracy.

On the basis of the foregoing viewpoint, an adjusting mechanism is provided in the apparatus disclosed in the above-mentioned Patent Application. The adjusting mechanism adjusts the mounting posture of the vehicle behavior sensor relative to the vehicle body after the integrated unit had been mounted on the vehicle body. Accordingly, even if the mounting posture of the vehicle behavior sensor relative to the vehicle body is tilted from the reference posture when the integrated unit is mounted on the vehicle body, the mounting posture of said vehicle behavior sensor can be adjusted to conform to the reference posture. As a result, the signal output from the vehicle behavior sensor can be made to coincide with a signal having the value which indicates the vehicle behavior with high accuracy.

Meanwhile, even when the mounting posture of the integrated unit (and accordingly, the mounting posture of the vehicle behavior sensor) conforms to the reference posture, a case may be assumed wherein the mounting posture of the integrated unit becomes tilted from the reference posture due to deformation of a frame, a panel or the like caused by a subsequent collision of the vehicle or the like. When the vehicle is driven under this circumstance, the vehicle behavior sensor outputs a signal having a value different from the value which indicates the vehicle behavior with high accuracy. Therefore, a case may occur wherein the above-mentioned vehicle motion control (e.g., under-steer/over-steer suppression control or the like) on the basis of the signal output from the vehicle behavior sensor can not be appropriately performed.

Therefore, in such a case mentioned above, it is necessary to prohibit (or stop) performing said vehicle motion control. Further, it is necessary to notify (or warn) a driver of the vehicle that there is a possibility that the mounting posture of said integrated unit is tilted from the reference posture, and to urge the driver to make necessary repairs relating to an adjustment of the mounting posture of said integrated unit. However, any disclosures or suggestions relating to the aforesaid procedures are not described in the above-mentioned Patent Application.

SUMMARY OF THE INVENTION

Accordingly, an object of the present invention is to provide a vehicle motion control apparatus which is capable of taking appropriate measures when there is a possibility that a mounting posture of an integrated unit relative to a vehicle body is tilted (or inclined) from a reference posture.

The vehicle motion control apparatus according to the present invention comprises an integrated unit composed integrally of a control unit which mounts an actuator (motor, solenoid valve or the like) for controlling a vehicle motion, a vehicle behavior sensor which outputs a signal indicative of a vehicle behavior (yaw rate or the like) and a controller which controls said actuator on the basis of the signal output from said vehicle behavior sensor in order to control the vehicle motion.

The motion control apparatus is applied to a vehicle having a tilt-detection sensor (or an inclination-detection sensor) and a warning device. The tilt-detection sensor generates a tilt-signal (or an inclination-signal) serving as a signal to indicate there is a possibility that the mounting posture of the integrated unit relative to the vehicle body of the vehicle is tilted from the reference posture by a predetermined degree or more. The warning device provides a warning to notify the driver of an occurrence of abnormality in the mounting posture of said integrated unit (a warning associated with the motion control apparatus).

The motion control apparatus is characterized in that said controller comprises a control-prohibiting/warning means for executing a "control-prohibiting/warning process" which prohibits (or stops) the control of said actuator for said vehicle motion control and which makes said warning device provide said warning, when said tilt-detection sensor generates said tilt-signal.

With this configuration, when there is the possibility that the mounting posture of the integrated unit (and accordingly, the mounting posture of the vehicle behavior sensor) relative to the vehicle body is tilted from the reference posture, performing the vehicle motion control is prohibited. Accordingly, an occurrence of a case is avoided wherein the vehicle motion control is inappropriately performed. In addition, the warning is given so as to let the driver know the occurrence of the abnormality in mounting posture of the integrated unit. This can urge the driver to make necessary repairs relating to an adjustment of the mounting posture of the integrated unit (specifically, repairs to remove deformation of a frame, a panel or the like for mounting the integrated unit onto the vehicle body).

In this case, said tilt-detection sensor may be, for example, a sensor which is capable of directly detecting the mounting posture of the integrated unit relative to the vehicle body (alternatively, a tilt (or an inclination) of the mounting posture of the integrated unit from the reference posture), or a collision-detection sensor which detects a collision of the vehicle. As the collision-detection sensor, for example, an acceleration sensor which is mounted on the vehicle and/or an acoustic sensor for an airbag-deployment control, and/or an acceleration sensor which is mounted on a system for reducing a damage caused by collision of said vehicle may be used.

When said collision-detection sensor is used as said tilt-detection sensor, a signal which indicates that the degree of said collision of the vehicle is greater than a predetermined degree is used as said tilt-signal. This is based on the fact that the degree of tilt in the mounting posture of the integrated unit relative to the vehicle body becomes greater, as the degree of the collision of the vehicle is greater.

When a plurality of collision-detection sensors for the airbag control are mounted at a plurality of locations of the vehicle, respectively (when a plurality of the collision-detection sensors are mounted at sections of the vehicle which differ in distance from the integrated unit), it is preferable that said control-prohibiting/warning means be configured so as to execute said control-prohibiting/warning process, when said tilt-signal is generated from one of the collision-detection sensors which is mounted at a nearest position to said integrated unit among said plurality of collision-detection sensors.

When the plurality of collision-detection sensors are mounted, a signal output from the collision-detection sensor mounted at the nearest position to the integrated unit among the plurality of collision-detection sensors may become a signal having a value which indicates with the highest accuracy a tilt-degree (or an inclination-degree) of the mounting posture of the integrated unit relative to the vehicle body due to the collision of the vehicle. Therefore, according to the above-mentioned configuration, the generation of the "tilt-signal" (i.e., the signal to indicate that the degree of the collision of the vehicle is greater than the predetermined degree) may be detected at an appropriate timing. As a result, the above-mentioned "control-prohibiting/warning process" may be executed at an appropriate timing.

When the collision-detection sensor is used, it is preferable that, as said tilt-signal, a signal be used which indicates that the degree of the collision of the vehicle is greater than a predetermined degree lower than a degree corresponding to a start of control of the airbag system and/or the system for reducing the damage.

With this configuration, if a collision having a certain degree occurred which did not require the airbag to be deployed and has brought the possibility that the mounting posture of the integrated unit relative to the vehicle body is tilted from the reference posture, it is possible for the driver to subsequently move his/her vehicle to a repair dealer or the like in order to make necessary repairs relating to the adjustment of the mounting posture of the integrated unit.

In the motion control apparatus according to the present invention described above, it is preferable that said vehicle mount a storage means capable of storing information at a central section of said vehicle body, said storage means being configured so as to store (or write), when said tilt-detection sensor generates said tilt-signal, tilt-information (or inclination-information) which is information indicating that said tilt-signal has been generated and said control-prohibiting/warning means be configured so as to continue said control-prohibiting/warning process as long as said tilt-information is stored in said storage means.

In this case, it is preferable that said storage means be a means, for example, a backup RAM, an EPROM or the like, which stores (or writes) data under while power is provided thereto and which retains the stored data even during a term when power is not provided thereto.

Further, said central section of the vehicle is a section within a predetermined range from a centroid (or a center of gravity) of the vehicle (i.e., section adjacent to the centroid), such as a cluster panel section, an instrument panel section, a center floor panel (tunnel) section or the like. And also, the central section of the vehicle is a section to which an impact due to the collision of the vehicle is hard to be transmitted, and therefore, is the section where it is hard for a component, a device or the like mounted thereto to be replaced even after the collision of the vehicle occurred. A controller for the airbag control is often mounted onto the center floor panel section of the vehicle body or the like. Therefore, a preferred example of said storage means includes the backup RAM, EPROM or the like in the controller for the airbag control.

The above-mentioned "control-prohibiting/warning process" should be continuously executed till the repairs are completed which relate to the adjustment of the mounting posture of the integrated unit. Therefore, for example, a configuration is conceived wherein the above-mentioned "tilt-information" (the information indicating that the tilt-signal has been generated) is stored into the controller of the integrated unit (specifically, the backup RAM or the like) when the "tilt-signal" by the tilt-detection sensor is detected, and the above-mentioned "control-prohibiting/warning process" is continued till the "tilt-information" in the controller is deleted at a time of completion of the above-mentioned repairs (i.e., as long as the "tilt-information" in the controller has been stored).

The detection of the "tilt-information" by the tilt-detection sensor means that the considerably large impact was transmitted to the integrated unit itself (therefore, to the controller itself in the integrated unit) due to the collision of the vehicle or the like. In this case, a case may be assumed where the controller itself in the integrated unit is replaced by a new controller, instead of performing the repairs relating to the adjustment of the mounting posture of the integrated unit.

In the assumed case, the mounting posture of the integrated unit (and accordingly, the mounting posture of the vehicle behavior sensor) has still been maintained tilted from the reference posture. In addition, the above-mentioned "tilt-information" is not stored in the new controller. Therefore, when the vehicle is subsequently driven, the above-mentioned "control-prohibiting/warning process" is not executed. As a result, a case may occur where the above-mentioned vehicle motion control is inappropriately performed on the basis of the signal output from the vehicle behavior sensor which outputs the signal having the value different from the value indicating the vehicle behavior with high accuracy.

On the other hand, according to the above-mentioned configuration, the "tilt-information" is stored in said "storage means" which is mounted onto the central section of said vehicle body where it is difficult for the mounted component, device or the like to be replaced when the repair is made after the collision. Therefore, even when the mounting posture of the integrated unit (and accordingly, the mounting posture of the vehicle behavior sensor) has been kept tilted from the reference posture after the controller of the integrated unit had been replaced by a new one, the above-mentioned "control-prohibiting/warning process" can be continued. As a result, performing the vehicle motion control inappropriately can be avoided.

In a case where said tilt-information is stored in said storage means, it is preferable that said storage means be configured in such a manner that said tilt-information can be deleted only by a specific command from a device external to said vehicle. Since this configuration is capable of lowering a possibility that the "tilt-information" is deleted by a mistake for some reasons, performing the above-mentioned vehicle motion control inappropriately can be avoided more securely.

In this case, said "specific command from the device external to the vehicle" is, for example, a specific command (signal) or the like which is output from a diagnosis unit (diagnosis tester) used by the repair dealer or the like.

In the above-mentioned motion control apparatus according to the present invention, it is preferable that said vehicle be configured so as to be capable of mounting onto said central section of the vehicle body a second vehicle behavior sensor which outputs a signal indicative of said vehicle behavior, the second vehicle behavior sensor being a sensor different from said vehicle behavior sensor integrated in said integrated unit, and it is preferable that said controller comprise an input section which inputs the signal output from said second vehicle behavior sensor and be configured so as to be capable of controlling said actuator on the basis of the signal output from the second vehicle behavior sensor of the same in order to control said vehicle motion. In this case, said "central section of the vehicle body" has the same meaning as described above, and is, for example, the section adjacent to the centroid of the vehicle such as the cluster panel section, the instrument panel section, the center floor panel section (tunnel).

The above-mentioned configuration is intended to be suitable for the assumption in which it is difficult or impossible to perform the repairs relating to the adjustment of the mounting posture of the integrated unit (specifically, the repairs being to remove the deformation of the frame, panel etc. for fixing the integrated unit onto the vehicle body or the like). According to the above-mentioned configuration, the second vehicle behavior sensor may be mounted onto the above-mentioned "central section of the vehicle body". Since the central section of the vehicle is the section to which an impact due to the collision of the vehicle is hard to be transmitted, it is hard for the frame, panel or the like which mounts the second vehicle behavior sensor onto the vehicle body to be deformed, even if the collision of the vehicle occurs. In other words, even if the collision of the vehicle occurs, it is unlikely that the mounting posture of the second vehicle behavior sensor is tilted from the reference posture (designed normal mounting posture).

Therefore, when the mounting posture of the integrated unit is tilted from the reference posture due to the collision of the vehicle or the like and, further, it is difficult or impossible to perform the repairs relating to the adjustment of the mounting posture of the integrated unit, it is possible to appropriately perform the vehicle motion control on the basis of the signal output from the second vehicle behavior sensor in place of the vehicle behavior sensor in the integrated unit, if the second vehicle behavior sensor is mounted onto the above-mentioned "central section of the vehicle body".

The collision-detection sensor may be mounted onto the vehicle separately from the integrated unit. The collision-detection sensor may be mounted onto the integrated unit. In the case where the collision-detection sensor is mounted onto the integrated unit, the vehicle behavior sensor which outputs, as the signal indicative of the behavior of the vehicle, a signal indicative of an acceleration and/or a deceleration of the vehicle can be (also) used as the collision-detection sensor.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
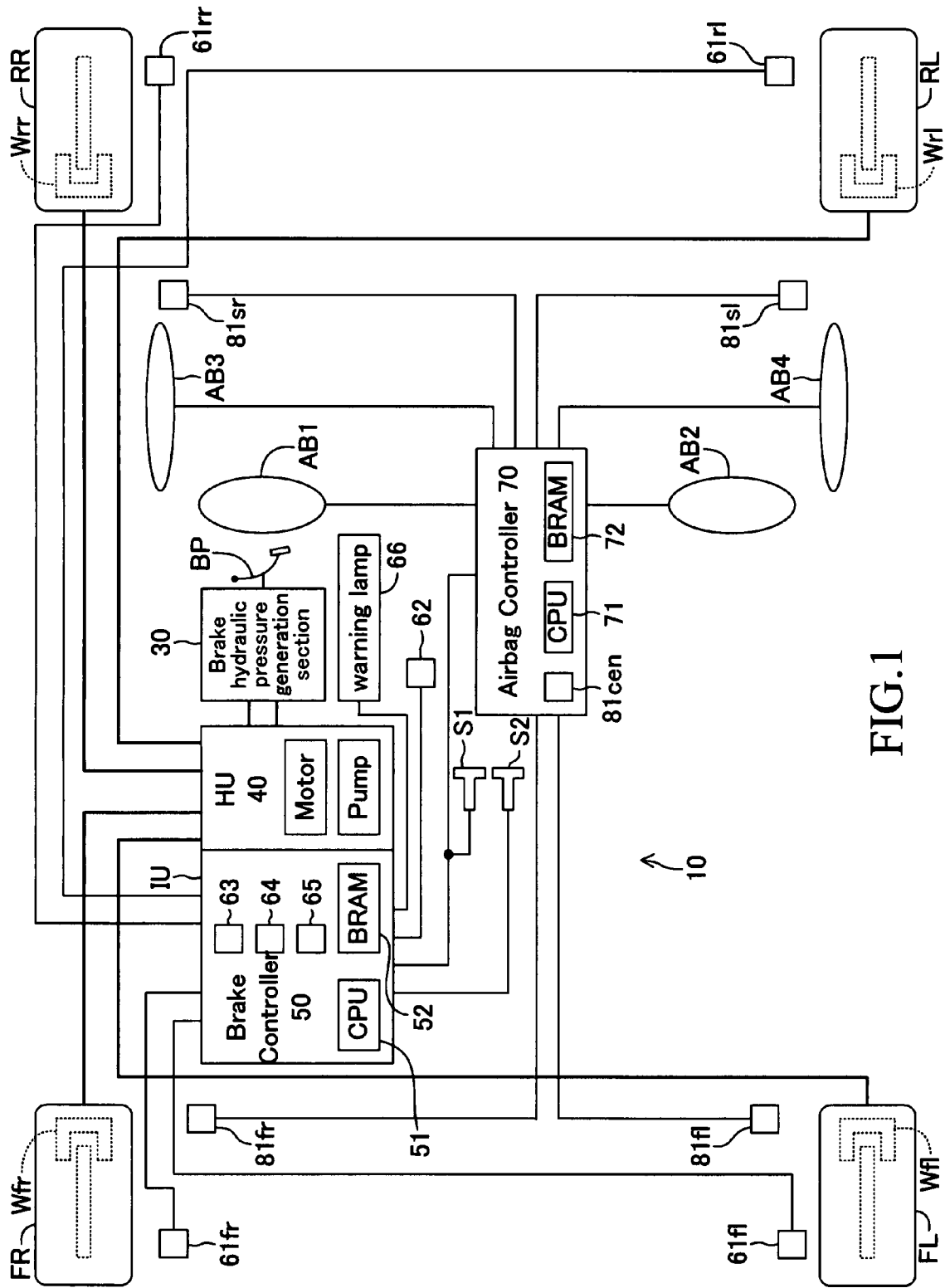
FIG. 1 is a schematic structural diagram of a vehicle equipped with a vehicle motion control apparatus according to a first embodiment of the present invention.

Embodiments of a vehicle motion control apparatus according to the present invention will next be described while referring to the drawings.

First Embodiment

FIG. 1 illustrates a schematic structure of a vehicle on which a motion control apparatus 10 according to the first embodiment of the present invention is mounted.

The motion control apparatus 10 is configured so as to comprise a brake hydraulic pressure generating section 30 for generating a brake hydraulic pressure depending on a brake operation by a driver, an integrated unit IU composed integrally of a control unit 40 (a hydraulic unit, hereinafter simply referred to as a "HU 40") and a brake controller 50.

The integrated unit IU is fixed onto a vehicle body of the vehicle (specifically, a certain frame, panel or the like at a right side in an engine room). When the frame, the panel or the like for fixing the aforementioned integrated unit IU onto the vehicle body maintains a designed normal shape, a mounting posture of the integrated unit IU relative to the vehicle body conforms to a reference posture (a normal posture in design, a posture within a range of tolerance in design).

Figure 2:
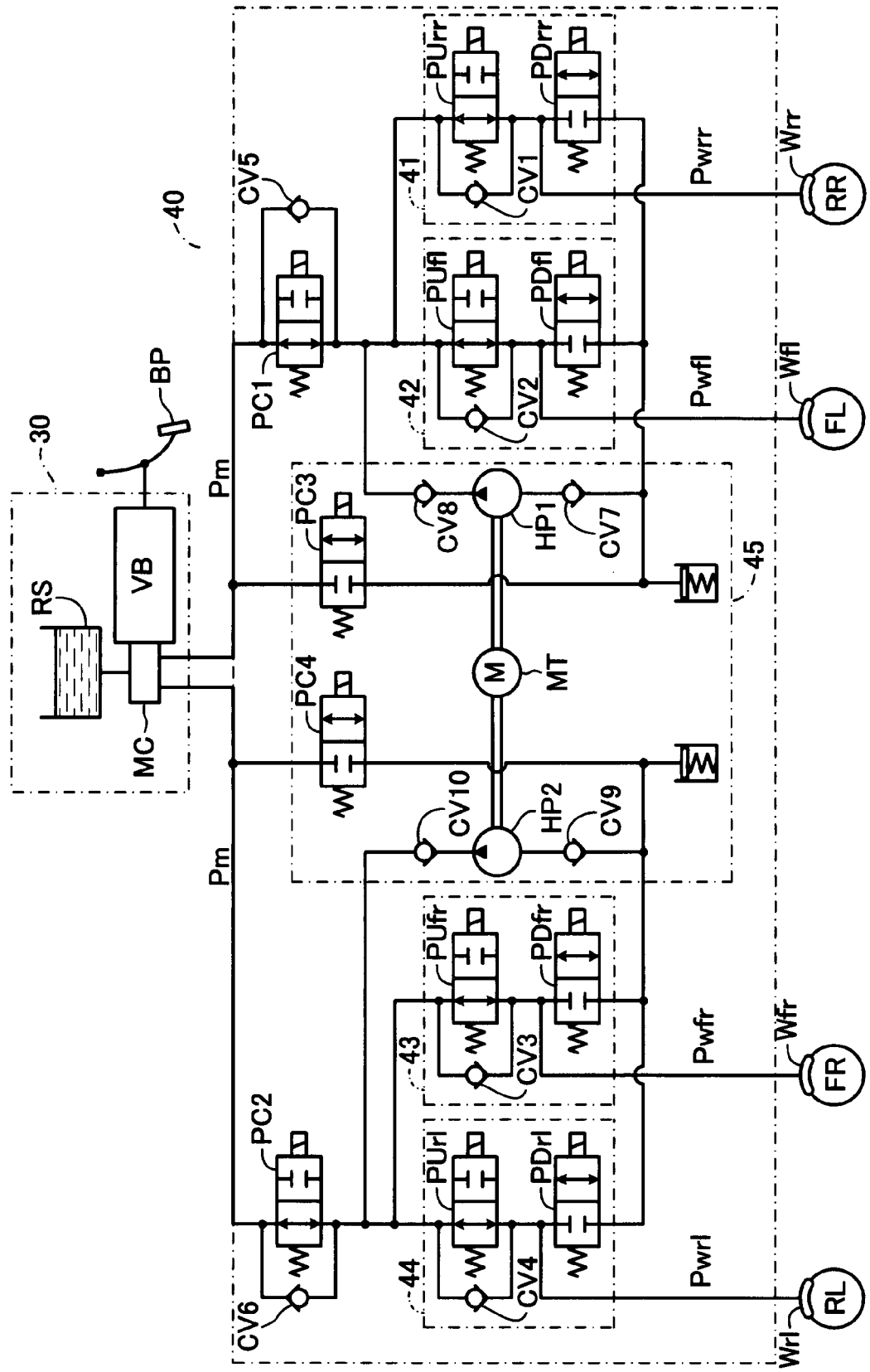
FIG. 2 is a schematic structural diagram of a brake hydraulic pressure generation section and a hydraulic unit shown in FIG. 1.

The brake hydraulic pressure generation section 30 comprises, as shown in FIG. 2 illustrating a schematic configuration thereof, a vacuum booster VB which operates according to an operation of a brake pedal BP, and a master cylinder MC which is connected to the vacuum booster VB. The vacuum booster VB utilizes an air pressure (negative pressure) in an unillustrated intake pipe of an engine to assist an operation force of the brake pedal BP at a predetermined rate, thereby transmitting the assisted operation force of the same to the master cylinder MC.

The master cylinder MC has two-output-port systems consisting of a first port and a second port. The master cylinder MC receives a brake fluid supplied from a reservoir RS to generate a first master cylinder pressure Pm corresponding to said assisted operation force from the first port and to generate a second master cylinder pressure Pm corresponding to said assisted operation force from the second port. The second master cylinder pressure Pm is substantially same as the first master cylinder pressure Pm.

The structures and operations of the master cylinder MC and the vacuum booster VB are well known, and therefore an explanation of the details thereof will be omitted. In this manner, the master cylinder MC and the vacuum booster VB generate the first master cylinder hydraulic pressure Pm and the second master cylinder hydraulic pressure Pm, both corresponding to the operating force of the brake pedal BP.

The HU 40, as shown in FIG. 2 illustrating a schematic configuration thereof, is configured so as to include a RR brake hydraulic pressure adjusting section 41, a FL brake hydraulic pressure adjusting section 42, a FR brake hydraulic pressure adjusting section 43, and a RL brake hydraulic pressure adjusting section 44 that can respectively adjust brake hydraulic pressure supplied to wheel cylinders Wrr, Wfl, Wfr, and Wrl respectively arranged at wheels RR, FL, FR, and RL, as well as a return brake fluid supplying section 45.

The above-mentioned first port of the master cylinder MC belongs to one of the systems relating to the wheels RR and FL. A normally-open solenoid open-close valve PC1 is interposed between the first port of the same and an upstream side of the RR brake hydraulic pressure adjusting section 41 and of the FL brake hydraulic pressure adjusting section 42. Similarly, the second port of the master cylinder MC belongs to the other of the systems relating to the wheels FR and RL. A normally-open solenoid open-close valve PC2 is interposed between the second port and an upstream side of the FR brake hydraulic pressure adjusting section 43 and of the RL brake hydraulic pressure adjusting section 44.

The RR brake hydraulic pressure adjusting section 41 consists of a pressure-increasing valve PUrr, which is a normally-open solenoid open-close valve of a 2-port, 2-position change-over type, and a pressure-decreasing valve PDrr, which is a normally-closed solenoid open-close valve of a 2-port, 2-position change-over type. The pressure-increasing valve PUrr can establish or break communication between the upstream side of the RR brake hydraulic pressure adjusting section 41 and the wheel cylinder Wrr. The pressure-decreasing valve PDrr can establish or break communication between the wheel cylinder Wrr and the reservoir RS1. As a result, the brake fluid pressure in the wheel cylinder Wrr (wheel cylinder pressure Pwrr) can be increased, held, or decreased through the control of the pressure-increasing valve PUrr and the pressure-decreasing valve PDrr.

In addition, a check valve CV1 which allows flow of the brake fluid in only one direction from the wheel cylinder Wrr side to the upstream side of the RR brake hydraulic pressure adjusting section 41 is provided in parallel with the pressure-increasing valve Purr. As a result, when the brake pedal BP is released after having been operated, the wheel cylinder pressure Pwrr is rapidly decreased.

Similarly, the FL brake hydraulic pressure adjusting section 42, the FR brake hydraulic pressure adjusting section 43 and the RL brake hydraulic pressure adjusting section 44 comprise a pressure-increasing valve PUfl and a pressure-reducing valve PDfl, a pressure-increasing valve PUfr and a pressure-decreasing valve PDfr, and a pressure-increasing valve PUrl and a pressure-decreasing valve PDrl, respectively. By controlling each pressure-increasing valve and pressure-decreasing valve, the brake hydraulic pressure in the wheel cylinder Wfl, the wheel cylinder Wfr, and the wheel cylinder Wrl (wheel cylinder pressure Pwfl, Pwfr, Pwrl) can be increased, held, or decreased, respectively. Also, check valves CV2, CV3, and CV4 are arranged in parallel with the pressure-increasing valves PUfl, PUfr, and PUrl, respectively, to provide the same function as that of the above-mentioned check valve CV1.

Additionally, a check valve CV5 which allows flow of the brake fluid in only one direction from the first port of the master cylinder MC to an upstream side of the RR brake hydraulic pressure adjusting section 41 and an upstream side of the FL brake hydraulic pressure adjusting section 42 is arranged in parallel with the normally-open solenoid open-close valve PC1. Accordingly, even if the normally-open solenoid open-close valve PC1 is in its closed state, when the first master cylinder hydraulic pressure Pm becomes higher than the pressures at the upstream side of the RR brake hydraulic pressure adjusting section 41 and the FL brake hydraulic pressure adjusting section 42 due to the operation of the brake pedal BP, the brake hydraulic pressure itself (i.e., the first master cylinder pressure Pm) depending on the operating force of the brake pedal BP may be supplied to the wheel cylinders Wrr and Wfl. Further, a check valve CV6 is also arranged in parallel with the normally-open solenoid open-close valve PC2 to provide the same function as that of the check valve CV5.

The return brake fluid supply section 45 includes a DC motor MT, and two hydraulic pumps (gear pumps) HP1 and HP2 which are simultaneously driven by the motor MT of the same, and normally-closed solenoid open-close valves PC3 and PC4. The normally-closed solenoid open-close valve PC3 is interposed between the first port of the master cylinder MC and the reservoir RS1. The normally-closed solenoid open-close valve PC4 is interposed between the second port of the master cylinder MC and the reservoir RS2.

The hydraulic pump HP1 pumps, via a check valve CV7, the brake fluid which is returned from the pressure-reducing valves PDrr and PDfl in the reservoir RS1, or the brake fluid from the first port of the master cylinder MC when the normally-closed solenoid open-close valve PC3 is in its open state. Then, the hydraulic pump HP1 supplies the pumped brake fluid to the upstream sides of the RR brake hydraulic pressure adjusting section 41 and the FL brake hydraulic pressure adjusting section 42 via a check valve CV8.

Similarly, the hydraulic pump HP2 pumps, via a check valve CV9, the brake fluid returned from the pressure-reducing valves PDfr and PDrl in the reservoir RS2, or the brake fluid from the second port of the master cylinder MC when the normally-closed solenoid open-close valve PC4 is in its open state. Then, the hydraulic pimp HP2 supplies the pumped brake fluid to the upstream sides of the FR brake hydraulic pressure adjusting section 43 and the RL brake hydraulic pressure adjusting section 44 via a check valve CV10.

In the above-explained structure, the HU 40 has connected thereto two pipes connected to the first and second ports of the master cylinder MC and four pipes connected to the wheel cylinders W (i.e., six pipes in total). The HU 40 consists of two hydraulic systems (or hydraulic circuits), one of which relates to the rear-right wheel RR and front-left wheel FL, and the other of which relates to the rear-left wheel RL and front-right wheel FR. The HU 40 can supply the brake hydraulic pressure (i.e., master cylinder pressure Pm) depending on the operating force of the brake pedal BP to the wheel cylinders W respectively, when all the solenoid valves are in their non-excited states.

It should be noted that in the description, the symbol "" appended to various variables or the like collectively represents the symbols fl, fr, rl, and rr to be appended to various variables or the like and indicates which of the wheels FR, FL, etc. the particular variable or the like relates to. For example, the wheel cylinder W collectively indicates the wheel cylinder Wfl for the front-left wheel, the wheel cylinder Wfr for the front-right wheel, the wheel cylinder Wrl for the rear-left wheel, and the wheel cylinder Wrr for the rear-right wheel.

On the other hand, under this circumstance, when the normally-open solenoid open-close valves PC1 and PC2 are energized to be in their closed states, the normally-closed solenoid open-close valves PC3 and PC4 are energized to be in their open states, and the motor MT (accordingly, hydraulic pumps HP1 and HP2) is driven, the HU 40 can supply brake hydraulic pressure higher than the master cylinder pressure Pm to the wheel cylinders W** respectively.

Additionally, the HU 40 can adjust the wheel cylinder pressures Pw independently through the control of the pressure-increasing valves PU and pressure-reducing valves PD**. That is, the HU 40 can adjust the braking force applied to each of the wheels independently, regardless of the operation of the brake pedal BP by the driver.

Referring back to FIG. 1, the brake controller 50 is a microcomputer which includes a CPU 51, an unillustrated ROM which previously stores routines (programs) to be executed by the CPU 51, tables (look-up tables and maps), constants, or the like, an unillustrated RAM in which the CPU 51 temporarily stores data as necessary, a backup RAM 52 which stores data when a power supply is on and which maintains the stored data during a term when the power supply is cut off, and an interface containing A/D converters, or the like.

The brake controller 50 is connected to wheel-velocity sensors 61**, and a steering-angle sensor 62, those of which are separated from the integrated unit IU, via predetermined harnesses, connectors or the like, so as to be capable of performing CAN communication with these sensors. Also, the brake controller 50 is electrically connected directly with a yaw rate sensor 63, a roll rate sensor 64, and a pitch rate sensor 65, those of which are built into (or accommodated in) the integrated unit IU (specifically, in a package or a housing of the brake controller 50), without using harnesses or connectors. Additionally, the brake controller 50 is connected also to a warning lamp 66, which is fixed to an instrument panel, serving as said warning device.

The wheel-velocity sensors 61 output signals which indicate a wheel velocity VW. The steering-angle sensor 62 detects an angle of a steering wheel to output a signal which indicates the steering angle θs. The yaw rate sensor 63 detects a yaw rate of the vehicle to output a signal which indicates the yaw rate Yrate. The roll rate sensor 64 detects a roll rate of the vehicle to output a signal which indicates the roll rate Rrate. The pitch rate sensor 65 detects a pitch rate of the vehicle to output a signal which indicates the pitch rate Prate.

Each of the yaw rate sensor 63, the roll rate sensor 64 and the pitch rate sensor 65 corresponds to a vehicle behavior sensor. In other words, six sensors, which are the yaw rate sensor, the roll rate sensor, the pitch rate sensor, a longitudinal acceleration sensor, a lateral acceleration sensor and a vertical acceleration sensor, are generally regarded as the vehicle behavior sensors. However, in this embodiment, the yaw rate sensor 63, the roll rate sensor 64 and the pitch rate sensor 65 are employed as representatives of the six sensors.

When the mounting posture of the integrated unit IU relative to the vehicle body coincides with the above-mentioned reference posture, the mounting postures of the vehicle behavior sensors 63, 64, and 65 relative to the vehicle body also conform to their reference postures (designed normal postures, postures within a range of tolerance in design).

That is, when the mounting posture of the integrated unit IU relative to the vehicle body coincides with the above-mentioned reference posture, each of the output signals Yrate, Rrate, and Prate from the vehicle behavior sensors 63, 64, and 65 becomes a signal having a value which indicates the vehicle behavior with high accuracy. On the other hand, when the mounting posture of the integrated unit IU relative to the vehicle body is tilted from the reference posture, for example, because of the deformation of the frame/panel for fixing the integrated unit IU onto the vehicle body caused by the collision of the vehicle or the like, each of the outputs Yrate, Rrate, and Prate does not become the value which indicates the vehicle behavior with high accuracy.

The vehicle mounts an airbag controller 70 in order to control a deployment of a driver-seat airbag AB1, a passenger-seat airbag AB2, a right-side airbag AB3 and a left-side airbag AB4. The airbag controller 70 is fixed onto a section adjacent to a centroid of the vehicle (corresponding to a central section of said vehicle body) within a center floor panel (tunnel). The airbag controller 70 is also a microcomputer which includes a CPU 71, an unillustrated ROM, an unillustrated RAM, a backup RAM 72 (corresponding to said storing means), and an interface containing A/D converters or the like in a similar manner as the brake controller 50. The airbag controller 70 is connected with the brake controller 50 so as to be capable of performing CAN communication with the brake controller 50.

The airbag controller 70 is electrically connected directly with an acceleration sensor 81cen for detecting a collision, which is built into the airbag controller 70. In addition, the airbag controller 70 is connected with the acceleration sensors 81 (satellite sensors) for detecting a collision, which are respectively arranged adjacently to the wheels , so as to be capable of performing the CAN communication with the acceleration sensors 81**.

Each of the acceleration sensors 81cen, 81fr, 81fl, 81rr, 81rl detects an acceleration at its respective position to output a signal for indicating acceleration Gcen, Gfr, Gfl, Grr, Grl, respectively. The acceleration sensor 81fr is mounted at a nearest position to the integrated unit IU among the acceleration sensors 81cen, 81fr, 81fl, 81rr, 81rl.

Therefore, the signal output from the acceleration sensor 81fr is a signal having a value which indicates with the highest accuracy a degree of impact applied to the frame/panel for fixing the integrated unit IU onto the vehicle body caused by the collision of the vehicle (therefore, a degree of deformation of the frame/panel). In other words, the signal output from the acceleration sensor 81fr is the signal having a value which indicates with the highest accuracy the degree of how much the mounting posture of the integrated unit IU relative to the vehicle body is tilted (or inclined) from the reference posture due to the collision of the vehicle. In this embodiment, the acceleration sensor 81fr corresponds to a tilt-detection sensor (or an inclination-detection sensor).

The airbag controller 70 (or the CPU 71 of the airbag controller 70) transmits a deployment signal to each of the driver-seat airbag AB1, the passenger-seat airbag AB2, the right-side airbag AB3, and the left-side airbag AB4 on the basis of the signals from the acceleration sensors 81*cen*, 81*fr*, 81*fl*, 81*rr*, 81*rl*.

The brake controller 50 (or the CPU 51 of the brake controller 50) transmits a lighting signal to the warning lamp 66 on the basis of the signal from the airbag controller 70. Also, the brake controller 50 transmits a driving signal to each solenoid valves and motor in HU 40 on the basis of signals from the sensors 61 to 65. Accordingly, the HU 40 can accomplish a well known vehicle stabilization control (specifically, under-steer/over-steer suppression control, hereinafter referred to as "ESC control") by instructions from the brake controller 50.

Specifically, when the brake controller 50 determines that the vehicle is in "an under-steer state" or "an over-steer state", the brake controller 50 controls the HU 40 to apply predetermined brake hydraulic pressure to a predetermined wheel. In addition, the brake controller 50 performs an engine output-power-reducing control which reduces an output power from an unillustrated engine (specifically, an opening degree of a throttle valve) by a predetermined amount from a value depending on an operation amount of an accelerator. Accordingly, the behavior of the vehicle is controlled and a trace-performance or stability in turning can be maintained. Since the aforementioned ESC control is well known, the detailed explanations on the ESC control will be omitted.

A connector S1 for connecting a diagnosis unit for a vehicle diagnosis is connected with a branch line of a signal wire for performing the CAN communication between the brake controller 50 and the airbag controller 70. As a result, the brake controller 50 can monitor a signal which is transmitted from the diagnosis unit connected to the connector S1.

In addition, the brake controller 50 is connected also with a connector S2 so as to be capable of performing the CAN communication through the connector S2. At the section adjacent to the centroid of the vehicle within the center floor panel (tunnel) (i.e., section adjacent to the airbag controller 70, corresponding to the central section of said vehicle body), this vehicle can mount/fix a second set of vehicle behavior sensors (i.e., the yaw rate sensor, the roll rate sensor, and the pitch rate sensor) each having the same model number as the vehicle behavior sensors 63, 64, 65, built into the integrated unit IU, in such a manner that the mounting postures of the second set of vehicle behavior sensors conform to the above-mentioned reference postures. It should be noted that said second set of vehicle behavior sensors may be composed of one or more vehicle behavior sensors, and therefore, said second set of vehicle behavior sensors may be conceptually referred as "a second vehicle behavior sensor".

The connector S2 is intended for being connected with the second set of vehicle behavior sensors which are mounted in the way described above. When the second set of vehicle behavior sensors are connected with the connector S2, the brake controller 50 can perform the above-mentioned ESC control on the basis of the signals from the second set of vehicle behavior sensors in place of the signals from the above-mentioned vehicle behavior sensors 63, 64, 65.

Actual Operation

Figure 3:
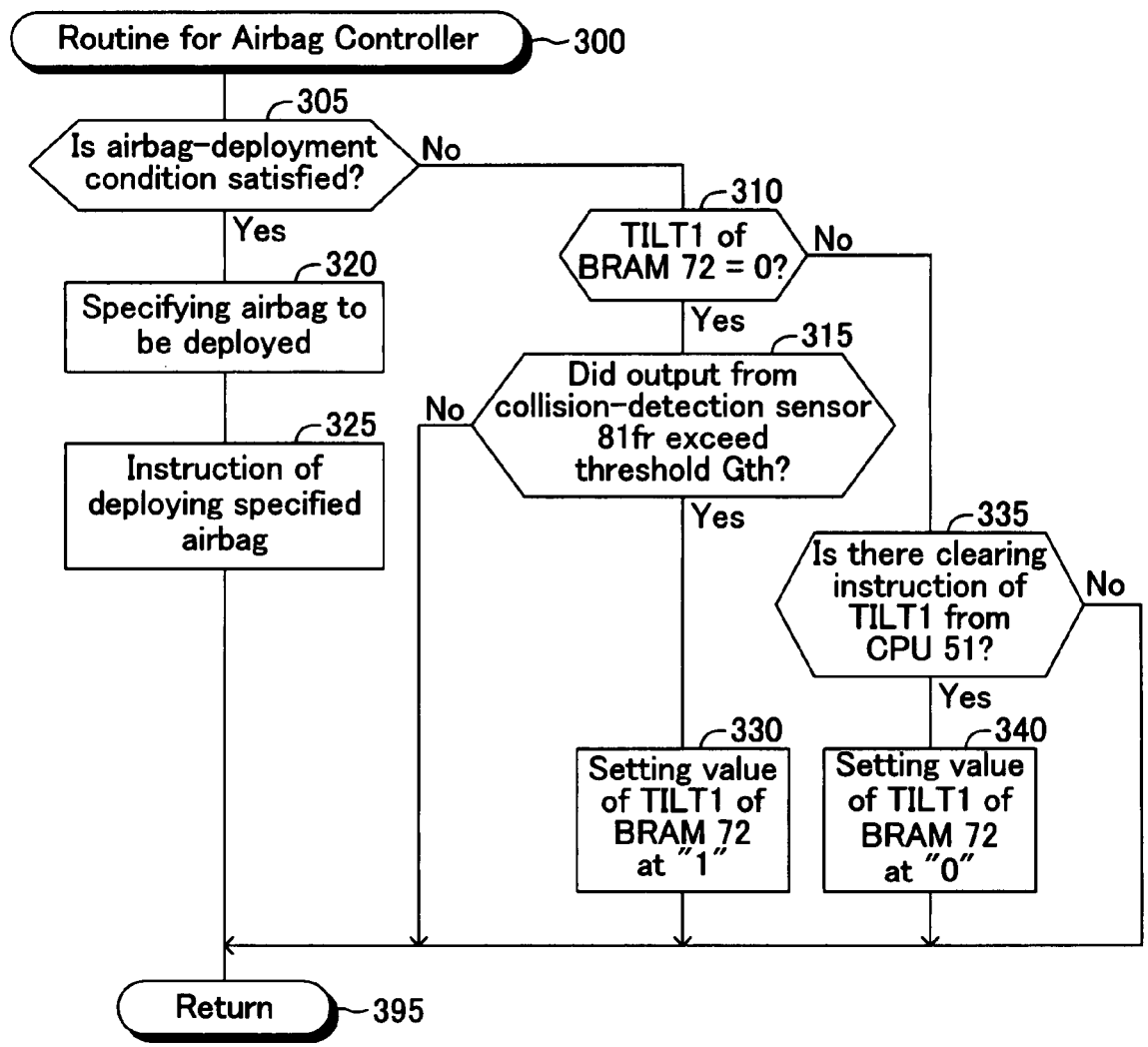
FIG. 3 is a flowchart illustrating a routine which is executed by a CPU of an airbag controller shown in FIG. 1.
Figure 4:
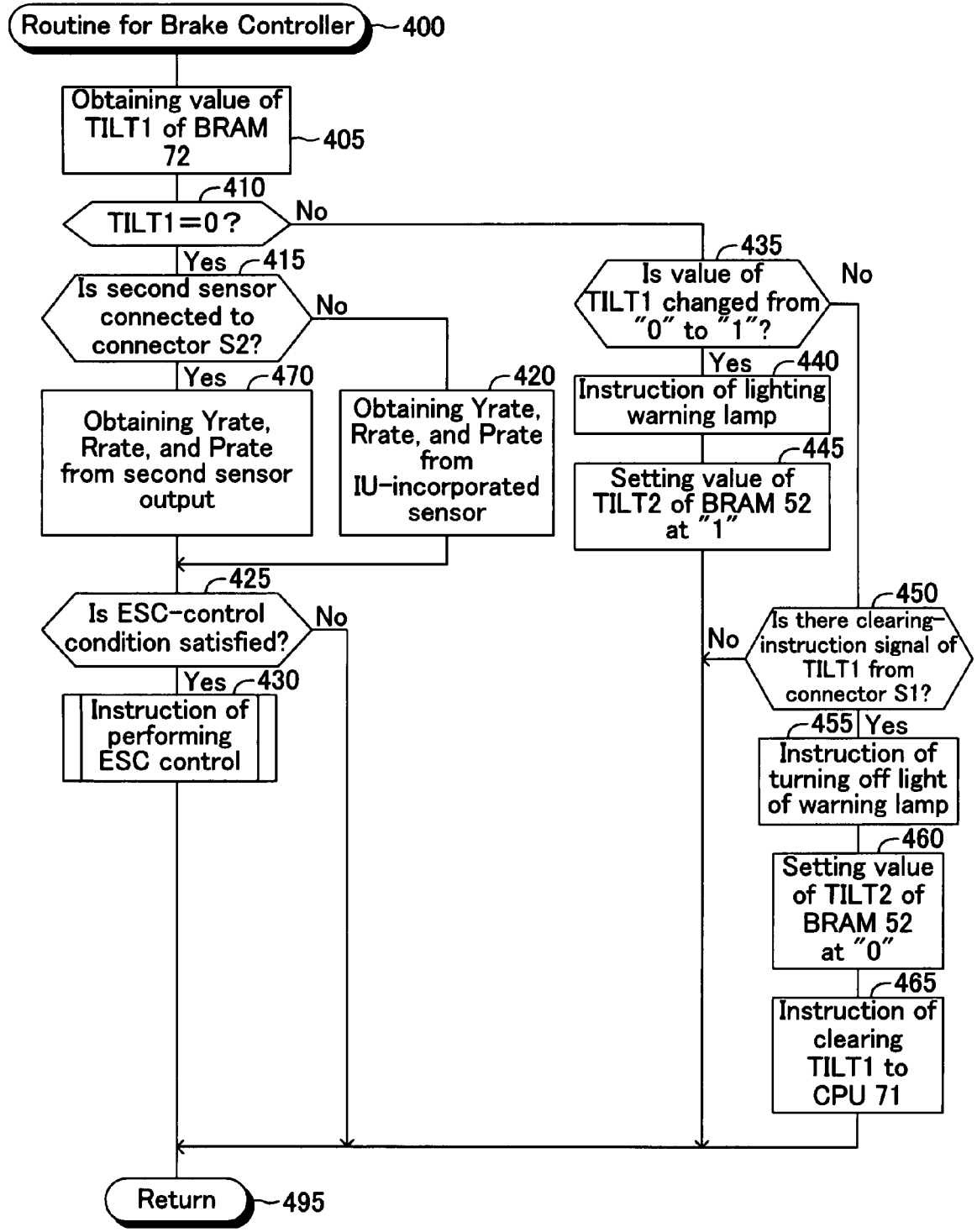
FIG. 4 is a flowchart illustrating a routine executed by a CPU of a brake controller shown in FIG. 1.

Actual operations by the vehicle motion control apparatus according to the present invention (hereinafter referred to also as "the present apparatus") will next be described while referring to FIG. 3 illustrating a routine for the airbag controller which is executed by the CPU 71 of the airbag controller 70 in a form of a flowchart, and FIG. 4 illustrating a routine for the brake controller which is executed by the CPU 51 of the brake controller 50 in a form of a flowchart.

First, a case is explained wherein the vehicle has not collided, the above-mentioned second set of vehicle behavior sensors are not connected with the connector S2, and a value of a flag TILT1 which has been stored in the backup RAM 72 of the airbag controller 70 is "0". The flag TILT1 indicates that said "control-prohibiting/warning process" is being executed when the value is "1", and that said "control-prohibiting/warning process" is not being executed when the value is "0". In this embodiment, the "control-prohibiting/warning process" corresponds to a process which prohibits the above-mentioned ESC control and which turns on the warning lamp 66.

The CPU 71 of the airbag controller 70 executes the routine in FIG. 3 repeatedly every passage of a predetermined time (e.g., 6 msec). Therefore, at a predetermined timing, the CPU 71 starts a process from Step 300 to proceed to Step 305 to determine whether or not an airbag-deployment condition is satisfied. The airbag-deployment condition is satisfied when, for example, at least one of the accelerations Gcen, Gfr, Gfl, Grr, Grl obtained respectively from the acceleration sensors 81*cen*, 81*fr*, 81*fl*, 81*rr*, 81*rl* exceeds a corresponding deployment reference value or the like.

At this time, since the vehicle has not collided, each of the accelerations does not exceed the corresponding deployment reference value. Therefore, the CPU 71 makes a determination of "No" in the Step 305 to proceed to Step 310 in which it determines whether or not the value of the flag TILT1, stored in the backup RAM 72, is "0". In this case, the CPU 71 makes a determination of "Yes" to proceed to Step 315 in which it determines whether or not the acceleration Gfr obtained from the acceleration sensor 81*fr* exceeds a threshold Gth smaller than the corresponding deployment reference value described above.

Here, the fact that the acceleration Gfr obtained from the acceleration sensor 81*fr* exceeds the above-mentioned threshold Gth corresponds to a generation of a "tilt-signal (or inclination-signal)" serving as said "signal which indicates that a degree of the collision of the vehicle is greater than the predetermined degree", namely, said "signal which indicates there is a possibility that the mounting posture of the integrated unit IU relative to the vehicle body is tilted from the reference posture by the predetermined degree or more".

At this point of time, since the vehicle has not collided, the acceleration Gfr is less or equal to the threshold Gth. Therefore, the CPU 71 makes a determination of "No" in the Step 315 and immediately proceeds to Step 395 to terminate this routine tentatively. Such processes (Steps 305, 310, 315, 395) are repeatedly executed till the vehicle collides and thus the condition in Step 305 or that of 315 is satisfied.

On the other hand, the CPU 51 of the brake controller 50 executes the routine in FIG. 4 repeatedly every passage of a predetermined time (e.g., 6 msec). Therefore, at a predetermined timing, the CPU 51 starts a process from Step 400 to proceed to Step 405 in which it obtains the value of the flag TILT1 in the backup RAM 72 of the airbag controller 70 through the CAN communication.

Subsequently, the CPU 51 proceeds to Step 410 to determine whether or not the value of the flag TILT1 is "0". As described above, since the value of the flag TILT1 is "0" at this point of time, the CPU 51 makes a determination of "Yes" in the Step 410 to proceed to Step 415 in which it determines whether or not the above-mentioned second vehicle behavior sensor is connected with the connector S2.

At this point of time, as described above, the above-mentioned second set of vehicle behavior sensors are not connected with the connector S2. Therefore, the CPU 51 makes a determination of "No" in the Step 415 to proceed to Step 420 in which it obtains the yaw rate Yrate, the roll rate Rrate, and the pitch rate Prate from the vehicle behavior sensors 63, 64, 65, respectively, which are built in the integrated unit IU.

Next, the CPU 51 proceeds to Step 425 to determine whether or not the ESC control condition is satisfied on the basis of the obtained yaw rate Yrate, the roll rate Rrate, the pitch rate Prate, the wheel velocities Vw obtained from the wheel-velocity sensors 61, and the steering angle θs obtained from the steering-angle sensor 62. Specifically, as described above, when the vehicle is determined to be in the "over-steer state" or "under-steer state", it is determined that an ESC control condition is satisfied.

When the ESC control condition is not satisfied, the CPU 51 immediately proceeds to Step 495 to terminate this routine tentatively. On the other hand, when the ESC control condition is satisfied, the CPU 51 proceeds to Step 430 to transmit the driving signals to the solenoid valve and the motor of the HU 40 on the basis of the outputs form the above-mentioned sensors 61 to 65. Accordingly, the ESC control is performed.

In this manner, when the value of the flag TILT1 in the backup RAM 72 is "0", the ESC control can be performed, and the warning lamp 66 is not turned on (does not light). So far, the case has been explained wherein the vehicle has not collided, said second set of vehicle behavior sensors are not connected with the connector S2 and the value of the flag TILT1 is "0" (hereinafter referred to also as "reference state").

Next, a case will be explained wherein the vehicle in this reference state has strongly collided in such a degree that the above-mentioned airbag-deployment condition is satisfied. In this case, when the CPU 71 of the airbag controller 70 executing repeatedly the routines in FIG. 3 proceeds to the Step 305 immediately after the collision, the CPU 71 makes a determination of "Yes" in Step 305 then to proceed to Step 320. In the Step 320, the CPU 71 specifies an airbag to be deployed among the airbags AB1 to AB4 on the basis of the accelerations Gcen, Gfr, Gfl, Grr, Grl which are obtained from the acceleration sensors 81*cen*, 81*fr*, 81*fl*, 81*rr*, 81*rl*, respectively.

Subsequently, the CPU 71 proceeds to Step 325 to transmit a deployment-instruction signal to an unillustrated inflator of the specified airbag. Accordingly, the specified airbag is deployed and the driver may be protected from an impact due to the collision of the vehicle. It should be noted that in this embodiment, once the airbag has been deployed, it is assumed that the vehicle become incapable of being driven thereafter.

Next, a case will be described wherein the vehicle in the above-mentioned reference state has collided but the degree of the collision is not so strong that the airbag-deployment condition described above is not satisfied, and the degree is such that the condition of the Step 315 is satisfied. This case corresponds to the above-mentioned "case wherein there is the possibility that the mounting posture of the integrated unit IU relative to the vehicle body is tilted from the reference posture by the predetermined degree or more". It should be noted that in this embodiment, it is assumed that the vehicle is still capable of being driven again after the collision of the aforementioned degree occurs.

In this instance, when the CPU 71 of the airbag controller 70, repeatedly executing the routines in FIG. 3, proceeds to the Step 305 immediately after the collision, the CPU 71 makes a determination of "No" in Step 305 and then makes a determination of "Yes" in the Step 310. Then, the CPU 71 makes a determination of "Yes" in the Step 315 to proceed to Step 330 in which it changes the value of the flag TILT1 in the backup RAM 72 from "0" to "1". Here, the fact that the value of the flag TILT1 is "1" corresponds to the fact that the tilt-information (or the inclination-information) has been stored in said storing means.

At this time, when the CPU 51 of the brake controller 50, repeatedly executing the routines in FIG. 4, proceeds to Step 410, the CPU 51 makes a determination of "No" to proceed to Step 435. Then, in Step 435, the CPU 51 determines whether or not the value of the flag TILT1 has been changed from "0" to "1".

Since this point of time is immediately after the value of the flag TILT1 has been changed from "0" to "1", the CPU 51 makes a determination of "Yes" in the Step 435 to proceed to Step 440 in which it transmits a lighting-instruction signal (or turning-on-instruction) to the warning lamp 66. In subsequent Step 445, the CPU 51 changes a value of a flag TILT2 stored in the backup RAM 52 of the brake controller 50 to "1", and thereafter, the CPU 51 proceeds to Step 495.

With these operations, thereafter, till a light-out-instruction (or turning-off-instruction) is generated, the warning lamp 66 continues lighting. In addition, thereafter, since the processes in Steps 425 and 430 can not be executed as long as the value of the flag TILT1 of the backup RAM 72 has been kept "1", the ESC control is not performed. That is, said "control-prohibiting/warning process" is executed.

It should be noted that the reason why the value of the flag TILT2 stored in the backup RAM 52 is changed to "1" is to record the history showing a fact existed in past, the fact being that the comparatively strong impact was applied to the brake controller 50, and the degree of the impact may have caused the possibility that the mounting posture of the integrated unit IU relative to the vehicle body is tilted from the reference behavior by the predetermined degree or more.

Thereafter, the CPU 51 makes a determination of "No" in each of Steps 410 and 435 to proceed to Step 450 in which the CPU 51 continues to monitor whether or not a clearing-instruction signal for the value of the flag TILT1 is generated from the connector S1. The clearing-instruction signal for the value of the flag TILT1 is a signal to instruct the value of the flag TILT1 to be set at "0", which is transmitted from the diagnosis unit connected with the connector S1. The clearing-instruction signal corresponds to said specific command from the device external to the vehicle.

Similarly, the CPU 71 of the airbag controller 70, executing the routine in FIG. 3, makes a determination of "No" in each of the Steps 305 and 310 to proceed to Step 335 in which the CPU 71 continues to monitor whether or not the clearing-instruction signal of the value of the flag TILT1 is generated from the CPU 51 of the brake controller 50.

That is, as long as the clearing-instruction signal for the value of the flag TILT1 is not generated from the diagnosis unit which is connected with the connector S1 (therefore, as long as said "tilt-information" has been stored in said storing means), said "control-prohibiting/warning process" continues.

Accordingly, since the warning lamp 66 keeps lighting, the driver of the vehicle may become aware that there is the possibility that the mounting posture of the integrated unit IU relative to the vehicle body is tilted from the reference posture by the predetermined degree or more (i.e., an occurrence of abnormality in the mounting posture of the integrated unit IU). As a result, the driver of the vehicle is urged to move his or her vehicle to a repair dealer or the like in order to make necessary repairs relating to the adjustment of the mounting posture of the integrated unit IU.

In this manner, when the vehicle is brought into the repair dealer or the like, a service man in the dealer or the like checks whether or not the mounting posture of the integrated unit IU conforms to the reference posture. If the mounting posture of the integrated unit IU dose not conform to the reference posture, the service man performs repairs relating to the adjustment of the mounting posture of the integrated unit IU. Specifically, the repairs or the like are performed to remove deformation of the frame, panel or the like for fixing the integrated unit IU onto the vehicle body. Also, if necessary, only the brake controller 50 or the entire of the integrated unit IU is replaced by a new one.

After it is confirmed that the mounting posture of the integrated unit IU has conformed to the reference posture through the aforementioned repairs or the like, the service man connects the diagnosis unit with the connector S1 and operates the diagnosis so as to transmit the above-mentioned "clearing-instruction signal for the value of the flag TILT1" from the diagnosis unit. It should be noted that it is preferable that the diagnosis unit be configured so as to instruct the service man or the like on a display or by voice to reconfirm if the mounting posture of the integrated unit IU conforms to the reference posture, before the transmission of aforementioned "clearing-instruction signal for the value of the flag TILT1".

In this manner, when the above-mentioned "clearing-instruction signal for the value of the flag TILT1" is transmitted from the diagnosis unit through the connector S1 and the CPU 51 of the brake controller 50, executing the routine in FIG. 4, proceeds to the Step 450, it makes a determination of "Yes" to proceed to Step 455 in which it transmits the light-out-instruction (or turning-off-instruction). In subsequent Step 460, the CPU 51 changes the value of the TILT2 in the backup RAM 52 from "1" to "0". Then, in subsequent Step 465, the CPU 51 transmits the clearing-instruction signal for the value of the flag TILT1 to the CPU 71 of the airbag controller 70. Accordingly, the warning lamp 66 is turned off.

At this time, when the CPU 71 of the airbag controller 70 repeatedly executing the routine in FIG. 3 proceeds to the Step 335, the CPU 71 makes a determination of "Yes" to proceed to Step 340 in which the CPU 71 changes the value of the flag TILT1 in the backup RAM 72 from "1" to "0" (i.e., deletes said tilt-information).

Accordingly, when the CPU 51 of the brake controller 50 repeatedly executing the routines in FIG. 4 proceeds to the Step 410, the CPU 51 makes a determination of "Yes" again and thus to repeat executing the processes which follow the Step 415. That is, the processes in the Steps 425 and 430 may be executed, and the ESC control may be performed again.

In this manner, when the above-mentioned "clearing-instruction signal of the value of the flag TILT1" is transmitted from the diagnosis unit through the connector S1 (therefore, when the value of the flag TILT1 becomes "0"), the ESC control is allowed to be performed, and the warning lamp 66 is turned off. In other words, the above-mentioned "control-prohibiting/warning process" is not executed, and the vehicle returns to the above-mentioned reference state.

As above, the case was explained wherein it was possible to make the mounting posture of the integrated unit IU to conform to the reference posture by the repairs relating to the adjustment of the mounting posture of the integrated unit IU. However, depending on a condition of the vehicle, a case may be assumed wherein it is difficult or impossible to perform the repairs which make the mounting posture of the integrated unit IU conform to the reference posture.

In such a case, it is possible for the service man in the repair dealer or the like to connect the second set of vehicle behavior sensors having the same model numbers as the vehicle behavior sensors 63, 64, and 65 (i.e., the yaw rate sensor, the roll rate sensor, and the pitch rate sensor) with the connector S2, and to mount/fix the second set of vehicle behavior sensors to the section adjacent to the above-mentioned centroid of the vehicle within the center floor panel (tunnel), under such condition that all functions of the integrated unit IU are normal other than the outputs from the vehicle behavior sensors 63, 64, and 65.

Since the impact due to the collision of the vehicle is hard to be transmitted to the section adjacent to the centroid of the vehicle within the center floor panel (tunnel), it is unlikely that the deformation occurs in the section to which the second set of vehicle behavior sensors in the center floor panel (tunnel) are fixed. Therefore, in this case, the second set of vehicle behavior sensors can be mounted onto the vehicle body in such a manner that the mounting postures conform to the reference postures. That is, the signals output from the second set of vehicle behavior sensors may become signals having values each of which indicates the vehicle behavior with high accuracy.

Then, after the service man in the repair dealer or the like has confirmed that the mounting postures of the second set of vehicle behavior sensors have conformed to the reference postures, the service man connects the above-mentioned diagnosis unit with the connector S1 and operates the diagnosis unit so as to transmit the above-mentioned "clearing-instruction signal for the value of the flag TILT1" from the diagnosis unit. As a result, as described above, the value of the flag TILT1 in the backup RAM 72 is changed from "1" to "0".

In this manner, when the second set of vehicle behavior sensors are connected with the connector S2, the CPU 51 of the brake controller 50 repeatedly executing the routines in FIG. 4 proceeds to the Step 415 and makes a determination of "Yes" then to proceed to the Step 470. Therefore, the CPU 51 obtains the yaw rate Yrate, the roll rate Rrate, and the pitch rate Prate from the second set of vehicle behavior sensors connected with the connector S2 in place of the vehicle behavior sensors 63, 64, and 65. Accordingly, even when the mounting posture of the integrated unit IU is kept tilted from the above-mentioned reference posture, the ESC control may be appropriately performed on the basis of the signals output from the above-mentioned second set of vehicle behavior sensors.

As explained above, in the vehicle motion control apparatus according to the embodiment of the present invention, the vehicle behavior sensors 63, 64, and 65 are integrally arranged in (or built into) the integrated unit IU which is integrally composed of the HU 40 and the controller 50. When the acceleration Gfr which is detected by the acceleration sensor 81*fr* (satellite sensor) mounted onto the section adjacent to the integrated unit IU for the airbag-deployment control exceeds the threshold Gth, the motion control apparatus determines that "there is the possibility that the mounting posture of the integrated unit IU relative to the vehicle body is tilted from the reference behavior by the degree greater than the predetermined one" (Specifically, determines that ""tilt-signal" is generated") to prohibit (or stop) performing the ESC control, and turn on (or light) the warning lamp 66 in order to notify the driver of the vehicle of an occurrence of abnormality in the mounting posture of said integrated unit IU (i.e., "control-prohibiting/warning process" is executed).

With this configuration, when there is the possibility that the mounting posture of the integrated unit IU relative to the vehicle body (i.e., the mounting posture of the vehicle behavior sensors 63, 64, and 65) is tilted from the reference posture, performing of the ESC control is prohibited. Accordingly, the case is avoided (or does not occur) where the ESC control is inappropriately performed on the basis of the signals from the vehicle behavior sensors 63, 64, and 65, the signals having the possibility not to indicate the vehicle behavior with high accuracy. In addition, by lighting the warning lamp 66, the driver can be urged to perform the repairs relating to the adjustment of the mounting posture of the integrated unit IU (specifically, the repairs to remove deformation of the frame or the panel for fixing the integrated unit IU onto the vehicle body or the like).

Further, when the "control-prohibiting/warning process" is executed, the "tilt-information" (the flag TILT1=1) is stored in the backup RAM 72 of the airbag controller 70 which is mounted onto the central section where the mounted component, device or the like is hard to be replaced by a new one, even in the case of the occurrence of the collision. In addition, till the "tilt-information" is deleted by the service man in the repair dealer or the like at the time of the completion of the above-mentioned repairs (i.e., as long as the flag TILT1=1), the "control-prohibiting/warning process" continues. Therefore, till the repairs relating to the adjustment of the mounting posture of the integrated unit IU is completed, the ESC control can be unfailingly avoided. As a result, the case may be unfailingly avoided where the above-mentioned vehicle motion control is inappropriately performed, while the mounting posture of the integrated unit IU is kept tilted from the reference posture.

Second Embodiment

Figure 5:
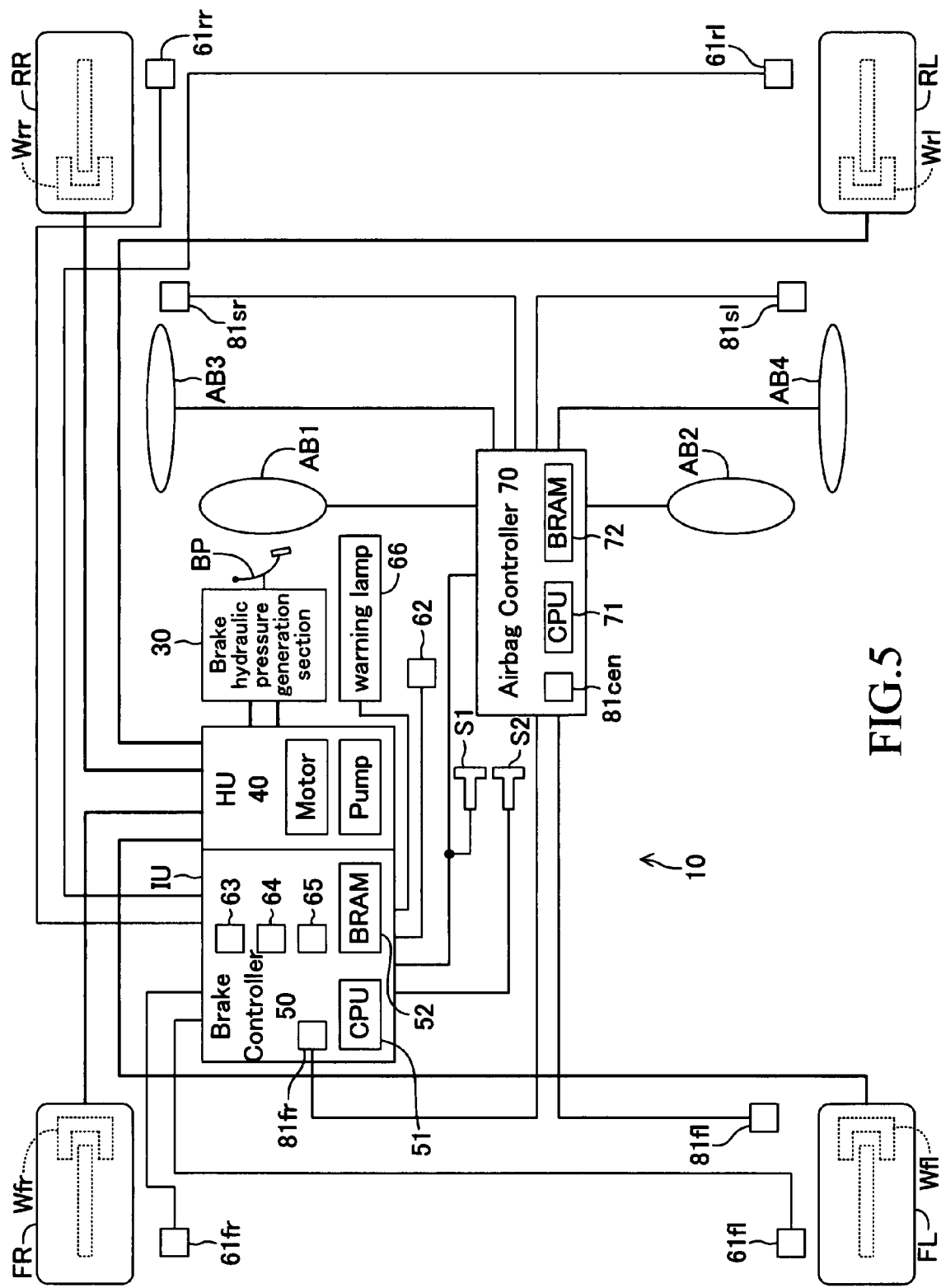
FIG. 5 is a schematic structural diagram of a vehicle equipped with a vehicle motion control apparatus according to a second embodiment of the present invention.

Next, the second embodiment of the vehicle motion control apparatus according to the present invention will be described. FIG. 5 illustrates a schematic structure of a vehicle on which the motion control apparatus according to the second embodiment of the present invention is mounted. As understood from FIG. 5, the second embodiment differs from the first embodiment where the acceleration sensor 81$fr$ for the airbag-deployment control, which is used as the "tilt-detection sensor", is mounted onto the vehicle separately from the integrated unit IU, only in an aspect in which the acceleration sensor 81$fr$ is built into the integrated unit IU.

Like this, also in a case where the acceleration sensor (collision-detection sensor), which serves as the "tilt-detection sensor", is built into the integrated unit IU, the signal output from the acceleration sensor is a signal having a value which indicates with the highest accuracy a degree of impact applied to the frame/panel for fixing the integrated unit IU onto the vehicle body caused by the collision of the vehicle (therefore, a degree of deformation of the frame/panel). Specifically, the signal output from the acceleration sensor 81$fr$ in the second embodiment is also the signal having a value which indicates with the highest accuracy the degree of how much the mounting posture of the integrated unit IU relative to the vehicle body is tilted (or inclined) from the reference posture due to the collision of the vehicle. The second embodiment can also exhibit the same operation and effect as the first embodiment.

Third Embodiment

Figure 6:
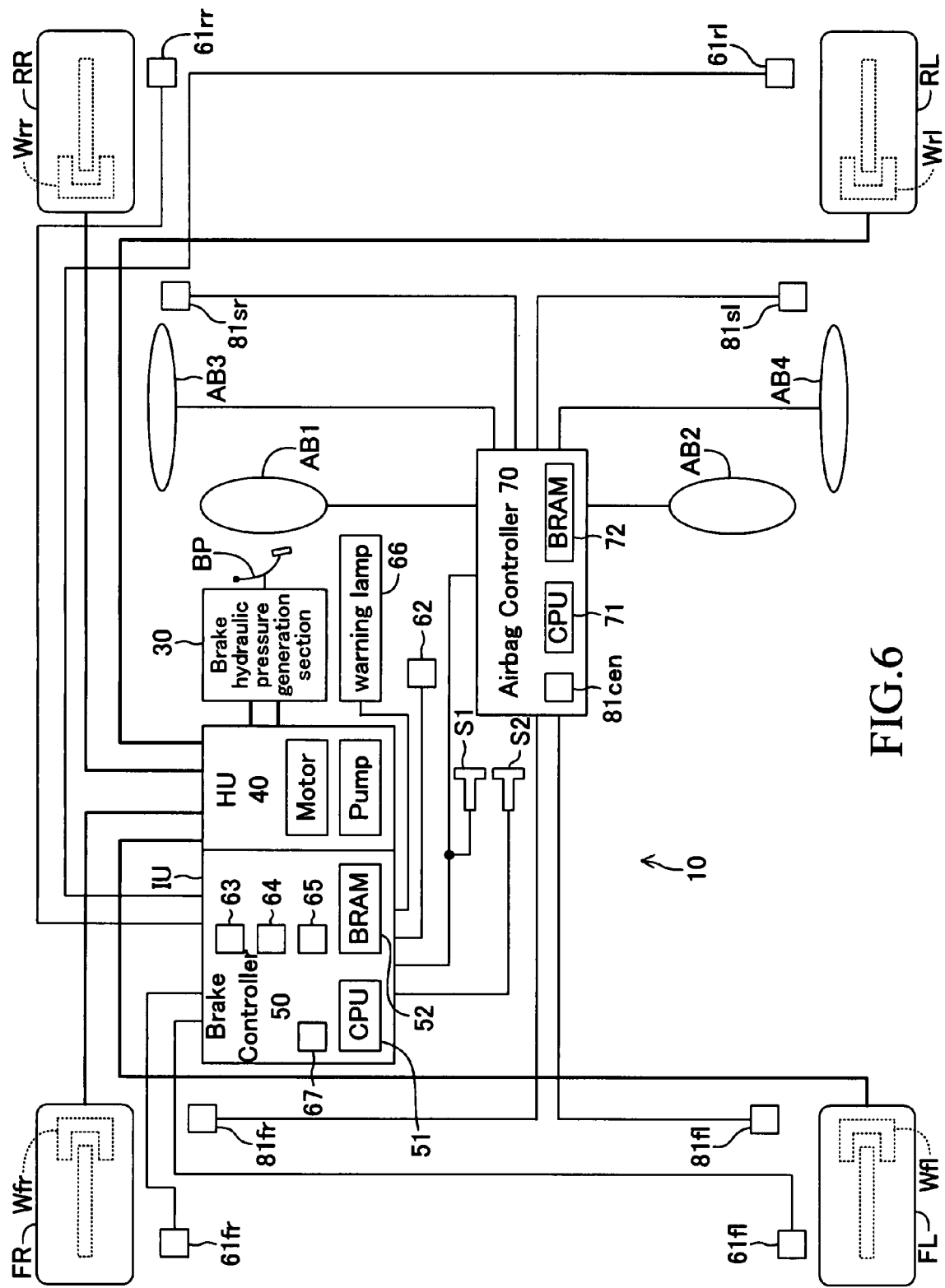
FIG. 6 is a schematic structural diagram of a vehicle equipped with a vehicle motion control apparatus according to a third embodiment of the present invention.

Next, the third embodiment of the vehicle motion control apparatus according to the present invention will be described. FIG. 6 illustrates a schematic structure of a vehicle on which the motion control apparatus according to the third embodiment of the present invention is mounted. The third embodiment differs from the first and second embodiments where the acceleration sensor 81$fr$ for the airbag-deployment control is used as the "tilt-detection sensor", in an aspect in which an acceleration sensor 67, which serves as the "vehicle behavior sensor", is built into the integrated unit IU and in an aspect in which this acceleration sensor 67 is used as the "tilt-detection sensor".

The signal output from the acceleration sensor 67, which is built into the integrated unit IU, is also the signal having a value which indicates with the highest accuracy the degree of how much the mounting posture of the integrated unit IU relative to the vehicle body is tilted (or inclined) from the reference posture due to the collision of the vehicle, like the signal output from the acceleration sensor 81$fr$ in the second embodiment.

The acceleration sensors 67 detects an acceleration at a section of the vehicle where the integrated unit IU is mounted to output a signal for indicating acceleration Giu. Because the acceleration sensor 67 is an acceleration sensor used for executing the vehicle stabilization control (specifically, the ESC control or the like), the detectable acceleration range (the upper limit value) of the acceleration sensor 67 is smaller than that of the acceleration sensor 81$fr$.

Therefore, the upper limit value Glim of the acceleration Giu is smaller than the threshold Gth concerning the acceleration Gfr obtained from the acceleration sensor 81$fr$. When actual acceleration which should be detected by the acceleration sensor 67 is greater than the threshold Gth, the acceleration Giu is maintained to be the upper limit value Glim. Therefore, the fact that "an acceleration exceeds the threshold Gth" can not be directly detected by using the acceleration sensor 67. In other words, the generation of the "tilt-signal" can not be directly detected by using the acceleration sensor 67. Accordingly, the generation of the "tilt-signal" is determined as follows in the third embodiment.

Figure 7:
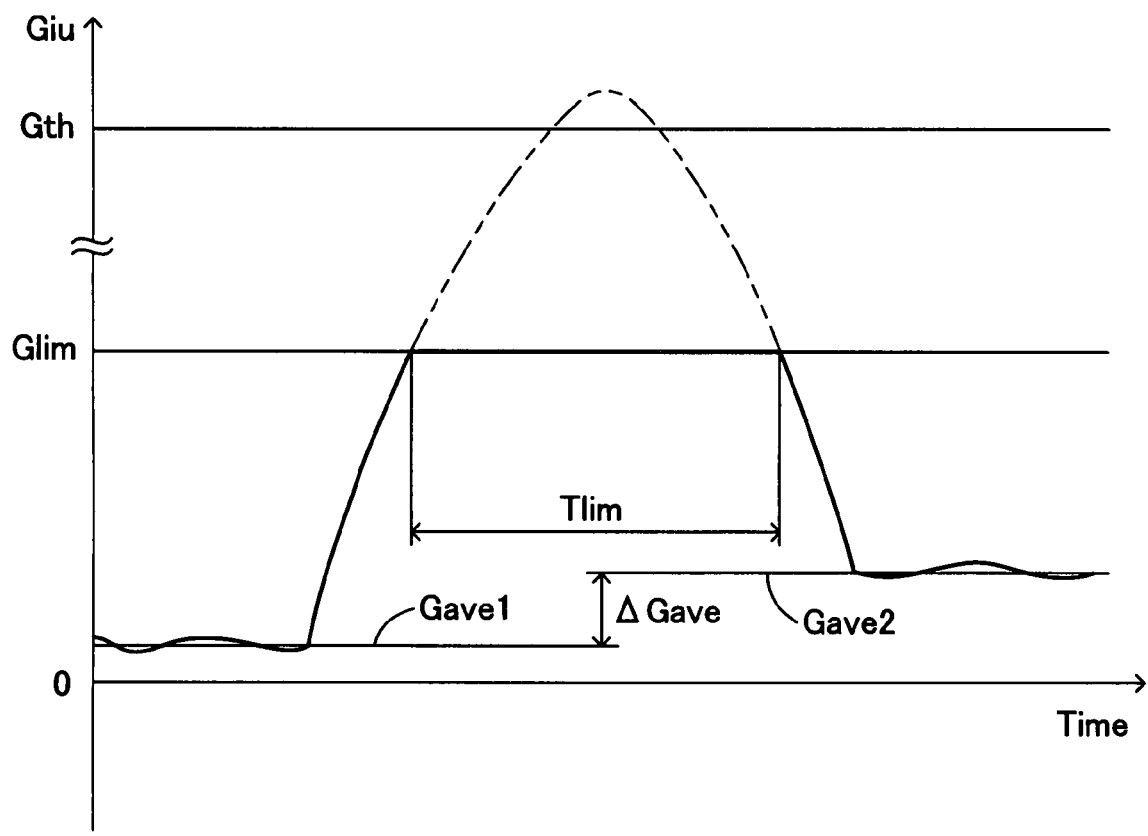
FIG. 7 is a time chart illustrating a change of the signal output from the acceleration sensor mounted on the integrated unit in a case where "control-prohibiting/warning process" is executed according to the third embodiment of the present invention.

As shown in FIG. 7, when actual acceleration at the section where the integrated unit IU is mounted increases and then exceeds the threshold Gth due to the collision of the vehicle, the acceleration Giu is maintained to be the upper limit value Glim while the actual acceleration is greater than the upper limit Glim. Hereinafter, this period is referred to as "period Tlim" (see FIG. 7). In addition, when the mounting posture of the integrated unit IU (namely, the mounting posture of the acceleration sensor 67) relative to the vehicle body is tilted from the reference posture, a time-average value (hereinafter referred to as "zero point") of acceleration Giu obtained from the acceleration sensor 67 is shifted.

From the above, in the third embodiment, when the above-mentioned period Tlim is equal to or longer than a predetermined period and when a difference (Δ Gave, see FIG. 7) between the zero points (Gave1 and Gave2) before and after the period Tlim is equal to or greater than a predetermined value, the generation of the "tilt-signal" is determined. As a result, the above-mentioned "control-prohibiting/warning process" is executed. With this configuration, the third embodiment can also exhibit the same operation and effect as the first and second embodiments.

The present invention is not limited to the above-mentioned embodiments, and various modifications can be made within a scope of the present invention. For example, although three sensors, i.e., the yaw rate sensor, the roll rate sensor, and the pitch rate sensor are used as the vehicle behavior sensor in the first and second embodiments, a single sensor out of these sensors, or any two sensors out of these sensors (an optional one sensor or optional two sensors) may be used as the vehicle behavior sensor instead of these three sensors. Alternatively, instead of these three sensors or in addition to these three sensors, any one of the longitudinal acceleration sensor, the lateral acceleration sensor and the vertical acceleration sensor may be used, singly or in combination.

Also, in the first and second embodiments, although the acceleration sensors for the airbag-deployment control are used as said tilt-detection sensor which is used in order to execute "control-prohibiting/warning process", an acoustic sensor for the airbag-deployment control may be used as said tilt-detection sensor.

Moreover, an acceleration sensor and/or an acoustic sensor mounted on a system for reducing a damage caused by a collision of the vehicle may be used as the tilt-detection sensor. The "system for reducing the damage caused by the collision of the vehicle" can be called "pre-crash safety system". This system may be, for instance, a system for winding a seat belt upon a collision and a system for moving a head rest forward upon a collision.

Further, under the assumption that the vehicle becomes incapable of being driven after the airbag is deployed, the above-mentioned embodiments are configured in such a manner that the "control-prohibiting/warning process" is not executed if the airbag-deployment condition is satisfied. However, even when and after the airbag-deployment condition is satisfied, the above-mentioned embodiment may be configured in such a manner that the "control-prohibiting/warning process" is executed.

Moreover, the above-mentioned embodiments are configured in such a manner that said "tilt-information" is stored in the backup RAM 72 of the airbag controller 70 fixed at a position corresponding to said "central section of the vehicle body". However, the above-mentioned embodiments may be configured in such a manner that said "tilt-information" is stored in the storing means fixed at an instrument panel section, a cluster panel section or the like, serving as said "central section of the vehicle body".

Furthermore, the first and second embodiments are configured in such a manner that, when the "clearing-instruction signal for the value of the flag TILT1" is transmitted, the value of the flag TILT2 in the backup RAM 52 of the brake controller 50 is changed from "1" to "0". However, the first and second embodiments may be configured in such a manner that, even when the "clearing-instruction signal for the value of the flag TILT1" is transmitted, the value of the flag TILT2 in the backup RAM 52 of the brake controller 50 maintains to be "1" (i.e., the Step 360 in FIG. 4 may be deleted).

Additionally, the first and second embodiments are configured in such a manner that, when the acceleration Gfr, which is detected by the acceleration sensor 81fr, exceeds the threshold Gth (i.e., when (in case) said "tilt-information" is generated), the CPU 71 of the airbag controller 70 directly sets the value of the flag TILT1 in the backup RAM 72 at "1". However, the first and second embodiments may be configured in such a manner that, when said "tilt-information" is generated, the CPU 51 of the brake controller 50 instructs the CPU 71 of the airbag controller 70 to set the value of the flag TILT1 at "1".

In addition, a case may be assumed where the above-mentioned embodiment may be configured to obtain a difference (or deviation) of the mounting posture of the vehicle behavior sensor relative to the vehicle body from the reference posture after the integrated unit has been mounted onto the vehicle body, and to correct the signal output from the vehicle behavior sensor using the obtained difference (i.e., to perform a zero-point correction), and then to perform the vehicle motion control on the basis of the corrected output from the vehicle behavior sensor (e.g., see Japanese Patent Application No. 2004-374051). In such a case, it is preferable that the above-mentioned embodiment be configured in such a manner that, when the difference of the mounting posture of the vehicle behavior sensor from the reference posture becomes greater than the predetermined degree, the warning is provided in order to let the driver know that "the difference of the mounting posture of the vehicle behavior sensor from the reference posture is greater than the predetermined degree", instead of performing the above-mentioned correction of the signal output from the vehicle behavior sensor.

What is claimed is:

1. A vehicle motion control apparatus for controlling a motion of a vehicle, the vehicle motion control apparatus comprising an integrated unit which is composed integrally of:

an actuator controlling a vehicle motion;
a vehicle behavior sensor outputting a signal indicative of a behavior of said vehicle; and
a controller controlling said actuator on the basis of the signal output from said vehicle behavior sensor, the vehicle having:

a tilt-detection sensor outputting a tilt-signal indicative of a possibility that a mounting posture of said integrated unit relative to a vehicle body of said vehicle is tilted from a reference posture by equal to or greater than a predetermined degree; and a warning device providing a warning associated with said motion control apparatus on the basis of said tilt-signal, wherein said controller comprises a control-prohibiting/warning means for executing a control-prohibiting/warning process which prohibits controlling said actuator and which makes said warning device provide said warning, when said tilt-detection sensor outputs said tilt-signal.

2. A vehicle motion control apparatus according to claim 1, wherein a collision-detection sensor, which detects a collision of said vehicle, is used as said tilt-detection sensor, and a signal, which indicates that a degree of the collision of the vehicle is greater than a predetermined degree, is used as said tilt-signal.

3. A vehicle motion control apparatus according to claim 2, wherein wherein at least one of an acceleration sensor and an acoustic sensor which is mounted onto a system is used as said collision-detection sensor, the system being one of an airbag system and a system for reducing damage caused by a collision of said vehicle.

4. A vehicle motion control apparatus according to claim 3, wherein said vehicle comprises a plurality of said collision-detection sensors which are mounted at sections of said vehicle which differ in distance from said integrated unit; and said control-prohibiting/warning means is configured so as to execute said control-prohibiting/warning process, when said tilt-signal is output from the collision-detection sensor which is mounted at a nearest section to said integrated unit among said plurality of collision-detection sensors.

5. A vehicle motion control apparatus according to claim 3, wherein a start degree is the degree of the collision corresponding to a start control of the system, and including a lower degree of the collision which is a predetermined degree lower than the start degree, and wherein as said tilt-signal, a signal is used which indicates that said degree of the collision is greater than the lower degree.

6. A vehicle motion control apparatus according to claim 1, wherein said vehicle mounts a storing means for storing tilt-information when said tilt-detection sensor outputs said tilt-signal, and said control-prohibiting/warning means is configured so as to continue said control-prohibiting/warning process as long as said tilt-information is stored in said storing means.

7. A vehicle motion control apparatus according to claim 1, wherein said vehicle is configured so as to be capable of mounting a second vehicle behavior sensor which outputs a signal indicative of said vehicle behavior at a central section of said vehicle, the second vehicle behavior sensor being different from said vehicle behavior sensor which is integrally mounted in said integrated unit, and said controller is configured so as to comprise an input section which inputs the signal output from said second vehicle behavior sensor, and to be capable of controlling said actuator on the basis of the signal output from the second vehicle behavior sensor of the same.

8. A vehicle motion control apparatus according to claim 2, wherein the collision-detection sensor is mounted onto said vehicle separately from said integrated unit.

9. A vehicle motion control apparatus according to claim 2, wherein the collision-detection sensor is mounted onto said integrated unit.

10. A vehicle motion control apparatus according to claim 9, wherein the vehicle behavior sensor which outputs, as said signal indicative of said behavior of said vehicle, a signal indicative of at least one of an acceleration and a deceleration of said vehicle is used as said collision-detection sensor.

* * * * *